Figure 1A:
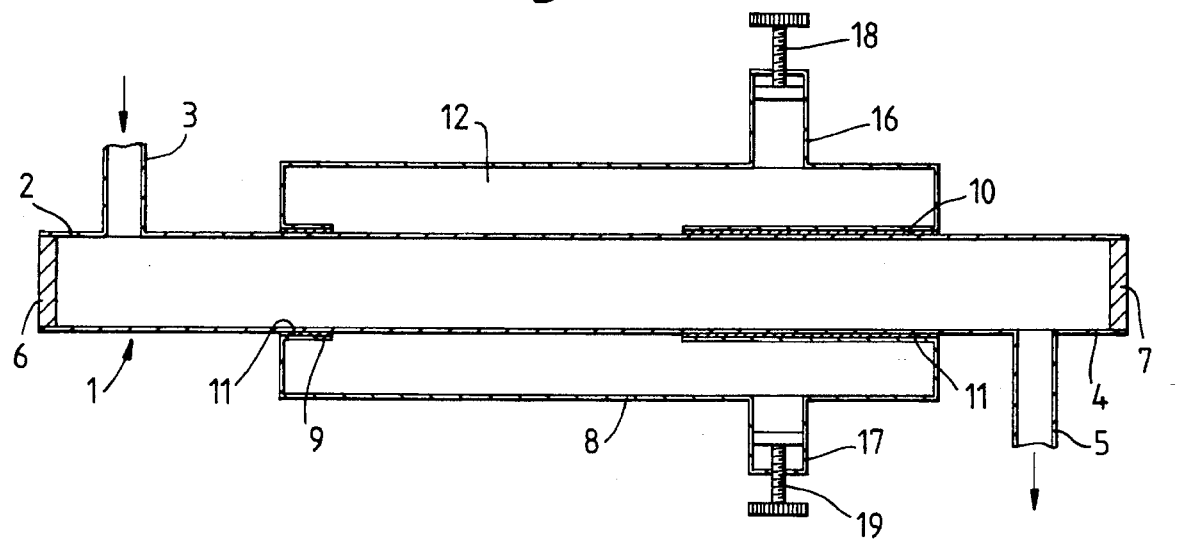

United States Patent [19]
Osborne et al.

[11] Patent Number: 5,579,332
[45] Date of Patent: Nov. 26, 1996

[54] PLASMA LIGHT SOURCE

[75] Inventors: Michael R. Osborne, Ickenham; Keith H. Bayliss, Bridgnorth, both of United Kingdom

[73] Assignee: United Kingdom Atomic Energy Authority, Didcot, United Kingdom

[21] Appl. No.: 327,830

[22] Filed: Oct. 24, 1994

[30] Foreign Application Priority Data

Nov. 16, 1993 [GB] United Kingdom .................. 9323601

[51] Int. Cl.$^6$ .................................................. H01S 3/03
[52] U.S. Cl. ................... 372/84; 372/55; 372/83; 372/64
[58] Field of Search .................. 372/84, 55, 83, 372/64, 85; 315/39

[56] References Cited

U.S. PATENT DOCUMENTS

| | | | |
|---|---|---|---|
| 3,911,318 | 10/1975 | Spero et al. | 315/39 |
| 4,698,822 | 10/1987 | Leprince . | |
| 4,755,764 | 7/1988 | Rosenberg et al. | 372/85 |
| 4,802,183 | 1/1989 | Harris . | |
| 4,877,509 | 10/1989 | Ogawa . | |
| 5,146,138 | 9/1992 | Ootera . | |
| 5,359,621 | 10/1994 | Tsunoda et al. | 372/55 |

FOREIGN PATENT DOCUMENTS

| | | |
|---|---|---|
| 1237009 | 6/1971 | United Kingdom . |
| 91/20106 | 12/1991 | WIPO . |

OTHER PUBLICATIONS

"High Power Microwave Discharge as an Excitation Source for Spectroscope Experiments", hattori et al, Journal Of Physics E: Scientific Instruments, 1971, vol. 4, pp. 280–282.

"Radial Distribution of Excited Atoms in a New Coaxial Line Type Microwave CW Discharge Tube", Kato et al, Journal of Applied Physics, 51 (10), Oct. 1980, pp. 5312–5315.

"Laser System Based on a Commercial Microwave Oscillator with Time Compression of a Microwave Pump Pulse," Arteev et al, Soviet Journal of Quantum Electronics, 22(6), Jun. 1992, p. 562.

*Primary Examiner*—Rodney B. Bovernick
*Assistant Examiner*—Yisun Song
*Attorney, Agent, or Firm*—William R. Hinds

[57] ABSTRACT

A light source including a gaseous medium which is excited to a light-emitting state by means of a microwave electromagnetic field, wherein the electromagnetic field is generated by circularly polarised microwave radiation. A preferred form of the invention is a laser.

24 Claims, 2 Drawing Sheets

PLASMA LIGHT SOURCE

The present invention relates to light sources in which the light-generating medium is a microwave excited plasma, and more specifically, to microwave excited gas lasers.

Light sources, and in particular, gas lasers in which the light-emitting medium is excited into a plasma state by means of microwave radiation are known. However, existing light sources of this type use linearly polarised microwave radiation to excite the gaseous medium to a light-emitting state. In these devices, the light-emitting plasma tends to break down into striations which follow the electric vector of the exciting microwave field. The stronger the microwave electric field, the more likely are these instabilities to occur. The effect is particularly critical in the case of microwave excited gas lasers as it limits both the maximum power and the pulse length of the laser radiation which can be produced.

It is an object of the present invention to provide improved microwave excited gaseous light sources.

According to the present invention there is provided a light source including a gaseous medium which is excited to a light-emitting state by means of a microwave electromagnetic field, wherein the electromagnetic field is generated by circularly polarised microwave radiation.

In a preferred form of the invention the light source is adapted to operate as a laser. A particular form of laser embodying the invention has a lasing medium consisting of helium with between 0.1 and 1% of xenon at a total pressure between 100 and 1000 mbar.

Figure 1B:
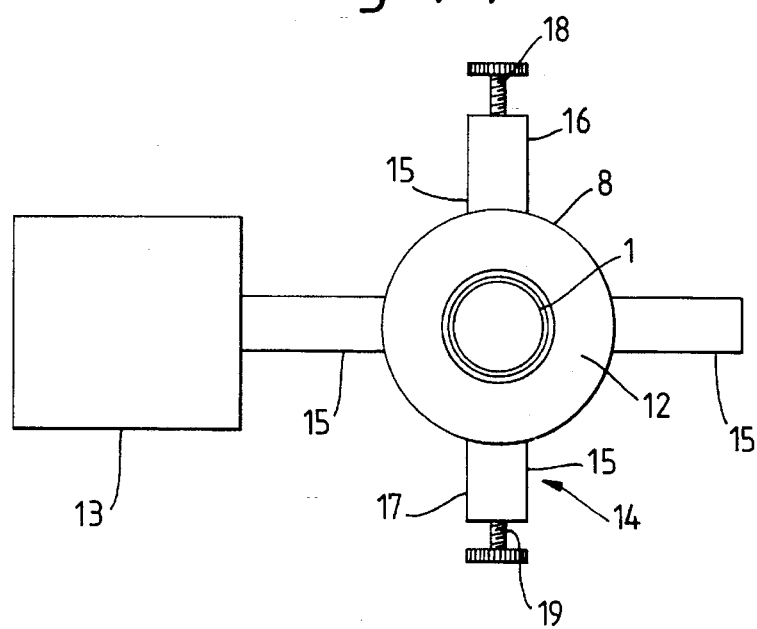
Figure 2A:
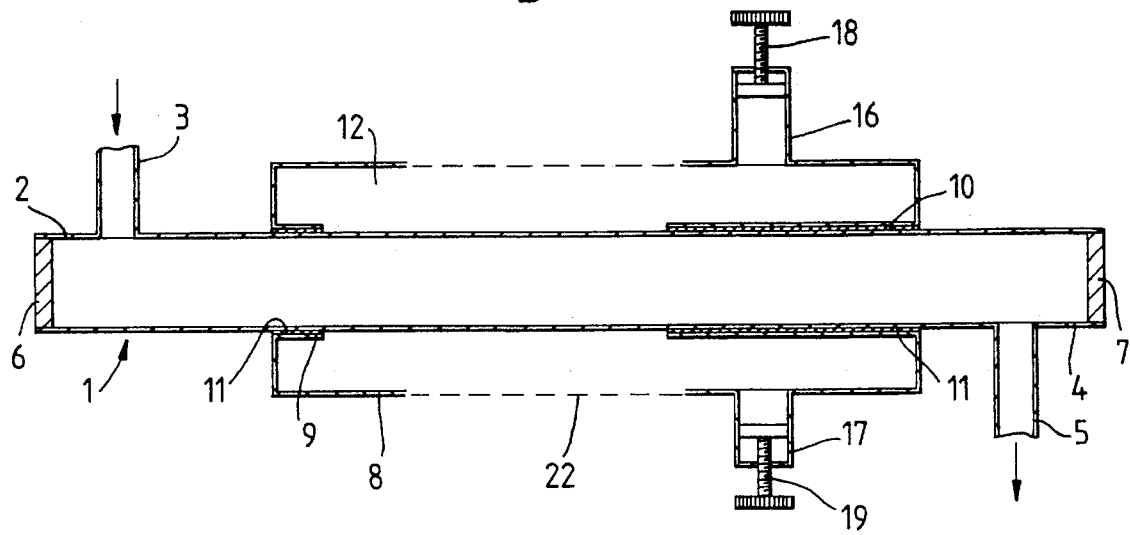
Figure 2B:
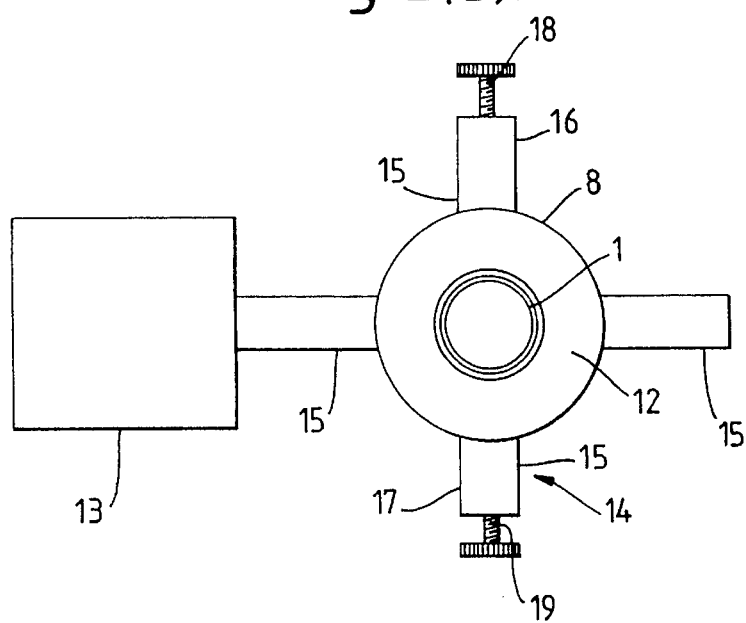

The invention will now be described, by way of example, with reference to the accompanying drawings in which, FIGS. 1(a) and 1(b) are schematic representations in longitudinal and transverse sections of a microwave excited gas laser embodying the invention, and FIGS. 2(a) and 2(b) are schematic representations longitudinal and transverse sections of a microwave excited light source embodying the invention.

Referring to FIG. 1, a microwave excited gas laser embodying the invention consists of a tubular excitation chamber 1 made of silica or other ceramic material which is transparent to microwave radiation. At one end 2, of the excitation chamber 1 is an inlet 3 for a gaseous lasing medium and at the other end 4 of the excitation chamber 1 is an outlet 5 for the gaseous lasing medium. The end 2 of the excitation chamber 1 is provided with a fully reflecting mirror 6 and the end 4 of the excitation chamber 1 is provided with a partially reflecting mirror 7. The separation between the mirrors 6 and 7 is such as to form an optical resonant cavity, in the usual way for a laser. An active region of the excitation chamber 1 is surrounded by a metal cylinder 8 which is closed by reentrant ends 9 and 10 which may incorporate a microwave absorbent material 11, or sections of waveguide cut off at the microwave frequency. The cylinder 8 forms a microwave resonant cavity 12. The re-entrant ends 9 and 10 and absorbers 11 of the microwave waveguide 12 prevent the leakage of microwave radiation from the microwave resonant cavity 12. Linearly polarised microwave radiation from a microwave generator 13 is injected into the microwave resonant cavity 12 via a turnstile junction 14 consisting of 4 regularly spaced stubs 15 of rectangular cross section, two of which, 16 and 17 incorporate adjustable ends 18 and 19 to enable circularly polarised microwaves to be established in the microwave resonant cavity 12.

The medium is chosen to provide a desired wavelength or wavelengths, of laser radiation. For example, a mixture of helium and between 0.1 and 1% of xenon will produce radiation having wavelengths including 2.03, 2.65, 3.43 and 3.65 microns. With this medium, total gas pressures of between 100 and 1000 mbar can be used, as can flow rates of between 0 and 10 litres/min. A suitable microwave frequency is 2.8 GHz, in pulses with a pulse repetition rate of up to 10 KHz.

FIG. 2 shows a second embodiment of the invention which is adapted to act as a plasma light source. Those components which have counterparts in the embodiment of the invention described with reference to FIG. 1 have the same reference numerals.

Referring to FIG. 2, the partially reflecting mirror 7 is replaced with fully-reflecting mirror 7' and a region of the metal cylinder 8 is replaced with a metal mesh 22 the holes of which are small enough to prevent the leakage of microwave radiation, but large enough to allow the emission of light radially from the chamber 1. Of course, in this case, the excitation chamber 1 has to be transparent to the light emitted by the plasma within it.

Using xenon or xenon chloride, the above embodiment is particularly suitable for providing a source of ultra violet light having wavelengths of 172 or 308 nm, respectively.

Examples of other gaseous media which can be used are as follows:

a) A mixture of 3% $F_2$, 50% Ar, and the balance He. This mixture, at a total pressure of 50 mbar and with flow rates between 20 and 60 cc $min^{-1}$, produces radiation having a wavelength of 193 um from the excited molecule ArF*, with an efficiency of between 6 and 7%.

b) A mixture of 4% $F_2$, 25% Kr and the balance He. This mixture, at a total pressure of 40 mbar and a flow rate between 50 and 120 cc $min^-$, produces radiation having a wavelength of 248 um from the excited molecule KrF*, with an efficiency between 15–17%.

c) A mixture of 4% $F_2$, 30% Xe and the balance He. This mixture, at a total pressure of 40 Mbar and a flow rate between 50 and 70 cc $min^{31\ 1}$, produces radiation having a wavelength of 351 um from the excited molecule XeF*, with an efficiency of between 7 and 8%.

d) A mixture of 0.5% HCl, 90% Xe and the balance He. This mixture, at a total pressure of 40 mbar and a flow rate between 100 and 200 cc $min^{-1}$ produces radiation having a wavelength of 308 um from the excited molecule XeCl*, with an efficiency of between 8 and 10%.

e) A mixture of 1% HCL, 90% Kr and the balance He. This mixture, at a total pressure of 90 mbar and a flow rate between 100 and 200 cc $min^{-1}$ produces radiation having a wavelength of 222 um from the excited molecule KrCl*, with an efficiency of between 7 and 8%.

Other gaseous media which can be used are nitrogen, carbon dioxide, hydrogen fluoride, deuterium fluoride, xenon chloride, xenon and gas mixtures typically used to provide light emission on these molecules (e.g. mixtures of $SF_6$, $D_2$, HCl).

We claim:

1. A light source including a gaseous medium which is excited to a light emitting state by means of a microwave electromagnetic field, including means for generating the electromagnetic field by circularly polarised microwave radiation.

2. A light source according to claim 1 wherein the gaseous medium includes one or more of the following gases: argon, chlorine, deuterium, fluorine, helium, krypton and xenon or compounds thereof.

3. A light source according to claim 1 wherein the gaseous medium includes one or more of the following gases: carbon dioxide, deuterium fluoride, hydrogen fluoride, xenon chloride, sulphur hexafluoride, deuterium and hydrogen chloride.

4. A light source according to claim 1 wherein the gaseous medium is at a pressure of up to a 1000 millibars.

5. A light source according to claim 1 wherein the gaseous medium is passed at a flow rate of between 0 and 10 litres $min^{-1}$ through an excitation chamber forming part of the light source in which it excited to the light emitting state.

6. A light source according to claim 2 wherein the gaseous medium comprises a mixture of helium and between 0.1 and 1% by volume of xenon at a total pressure of between 100 and 1000 mbars.

7. A light source according to claim 6 wherein the gaseous medium is passed through the excitation chamber at a flow rate of between 0 and 10 litres $min^{-1}$.

8. A light source according to claim 2 wherein the gaseous medium comprises a mixture of argon, fluorine and helium in the proportions of 50:3:47, respectively, at a total pressure of 50 mbar.

9. A light source according to claim 8 wherein the gaseous medium is passed through the excitation chamber at a flow rate of between 20 and 60 cc $min^{-1}$.

10. A light source according to claim 2 wherein the gaseous medium comprises a mixture of fluorine, helium and krypton in the proportions of 4:71:25, respectively, at a total pressure of 40 mbar.

11. A light source according to claim 10 wherein the gaseous medium is passed through the excitation chamber at a flow rate of between 50 and 120 cc $min^{-1}$.

12. A light source according to claim 2 wherein the gaseous medium is a mixture of fluorine, helium and xenon in the proportions 4:66:30, respectively, at a total pressure of 40 mbar.

13. A light source according to claim 12 wherein the gaseous medium is passed through the excitation chamber at a flow rate of between 50 and 70 cc $min^{-1}$.

14. A light source according to claim 1 wherein the gaseous medium comprises a mixture of hydrogen chloride, helium and xenon in the proportions 0.5:9.5:90, respectively, at a total pressure of 40 mbar.

15. A light source according to claim 14 wherein the gaseous medium is passed through the excitation chamber at a flow rate of between 100 and 200 cc $min^{-1}$.

16. A light source according to claim 1 wherein the gaseous medium comprises a mixture of hydrogen chloride, helium and krypton in the proportions 1:9:90, respectively, at a total pressure of 90 mbar.

17. A light source according to claim 16 wherein the gaseous medium is passed through the excitation chamber at a flow rate of between 100 and 200 cc $min^{-1}$.

18. A light source according to claim 1 adapted to act as a laser.

19. A light source according to claim 1 wherein there is included a cylindrical excitation chamber which is made of a material which is transparent to microwave radiation and has inlet and outlet ports by means of which a gaseous medium can be passed through the excitation chamber, a cylindrical waveguide surrounding the excitation chamber and adapted to form a microwave resonant cavity and means for establishing a circularly polarised microwave field in the microwave resonant cavity.

20. A light source according to claim 19 wherein the means for establishing a circularly polarised microwave field in the microwave resonant cavity comprises four regularly spaced waveguides to one of which a microwave generator is coupled and an opposed pair of which are adjustable in length so as to enable the microwave resonant cavity to be tuned to resonance.

21. A light source according to claim 19 wherein the excitation chamber is adapted to form part of an optical resonant cavity thereby to cause the light source to operate as a laser.

22. A light source according to claim 19 wherein the walls of the excitation chamber are transparent to the radiation produced by the excited gaseous medium and the cylindrical waveguide surrounding the excitation chamber is made of a metallic mesh the holes of which are small enough to prevent leakage of microwave radiation but large enough to transmit the radiation produced by the excited gaseous medium.

23. A light source according to claim 1 wherein the microwave radiation has a frequency of 2.8 $GH_z$.

24. A light source according to claim 1 wherein the microwave radiation is pulsed at a repetition rate of up to 10 $KH_z$.

* * * * *